(12) United States Patent
Guilhaumon et al.

(10) Patent No.: US 10,805,878 B2
(45) Date of Patent: Oct. 13, 2020

(54) METHOD AND APPARATUS FOR VOICE DATA TRANSMISSION

(71) Applicant: Apple Inc., Cupertino, CA (US)

(72) Inventors: Benoit Guilhaumon, Toulouse (FR); Eric Perraud, Plaisance du touch (FR)

(73) Assignee: Apple Inc., Cupertino, CA (US)

(*) Notice: Subject to any disclaimer, the term of this patent is extended or adjusted under 35 U.S.C. 154(b) by 294 days.

(21) Appl. No.: 15/505,542

(22) PCT Filed: Aug. 25, 2015

(86) PCT No.: PCT/US2015/046823
§ 371 (c)(1),
(2) Date: Feb. 21, 2017

(87) PCT Pub. No.: WO2016/048542
PCT Pub. Date: Mar. 31, 2016

(65) Prior Publication Data
US 2017/0280389 A1   Sep. 28, 2017

(30) Foreign Application Priority Data

Sep. 26, 2014  (EP) .................................... 14306506

(51) Int. Cl.
*H04W 52/02* (2009.01)
*H04W 76/28* (2018.01)
(Continued)

(52) U.S. Cl.
CPC ....... *H04W 52/0216* (2013.01); *G10L 19/012* (2013.01); *H04L 25/40* (2013.01);
(Continued)

(58) Field of Classification Search
CPC .... H04W 52/0216; H04W 76/28; G10L 25/78
(Continued)

(56) References Cited

U.S. PATENT DOCUMENTS

2009/0046627 A1* 2/2009 Xu .................. H04W 76/28
370/328
2009/0073959 A1   3/2009 Xu
(Continued)

FOREIGN PATENT DOCUMENTS

JP   2010534997 A   11/2010
JP   2010538516 A   12/2010

OTHER PUBLICATIONS

Japanese Patent Office—Notice of Reasons for Rejection dated Apr. 18, 2018 from Japanese Patent Application No. JP2017-510884, 6 pages.
(Continued)

*Primary Examiner* — Richemond Dorvil
*Assistant Examiner* — Rodrigo A Chavez
(74) *Attorney, Agent, or Firm* — Fish & Richardson P.C.

(57) ABSTRACT

Methods and apparatus are provided for transmitting voice data in a wireless communication system, in particular there is provided an apparatus comprising an audio processing module configured to detect a period of silence in a voice signal and to output an indication of the detected period of silence, and a communication module coupled to the audio processing module and configured to transmit upload packets according to a predefined scheduling allocation, the upload packets comprising the voice signal, wherein the communication module is further configured to, upon receipt of an indication of a detected period of silence refrain from transmitting further upload packets using the predefined scheduling allocation for a predetermined period of time.

26 Claims, 6 Drawing Sheets

(51) Int. Cl.
*G10L 25/78* (2013.01)
*G10L 19/012* (2013.01)
*H04L 25/40* (2006.01)
*H04L 27/32* (2006.01)

(52) U.S. Cl.
CPC ......... *H04L 27/32* (2013.01); *H04W 52/0254* (2013.01); *H04W 76/28* (2018.02); *G10L 25/78* (2013.01); *Y02D 30/70* (2020.08)

(58) Field of Classification Search
USPC ....................................................... 704/210
See application file for complete search history.

(56) References Cited

U.S. PATENT DOCUMENTS

| | | | |
|---|---|---|---|
| 2009/0232118 A1* | 9/2009 | Wang | H04L 5/0091 370/338 |
| 2009/0233613 A1 | 9/2009 | Furuta | |
| 2010/0130214 A1* | 5/2010 | Ahluwalia | H04W 76/28 455/450 |
| 2010/0238875 A1* | 9/2010 | Sung | H04L 1/1854 370/329 |
| 2011/0194538 A1 | 8/2011 | Zheng et al. | |
| 2012/0002628 A1* | 1/2012 | Kim | H04W 72/1252 370/329 |
| 2014/0162555 A1* | 6/2014 | Wernaers | H04W 76/28 455/41.2 |
| 2015/0282148 A1* | 10/2015 | Le | H04W 72/0406 370/329 |

OTHER PUBLICATIONS

International Search Report and Written Opinion for International Application No. PCT/US2015/046823 dated Oct. 27, 2015; 10 pages.

* cited by examiner

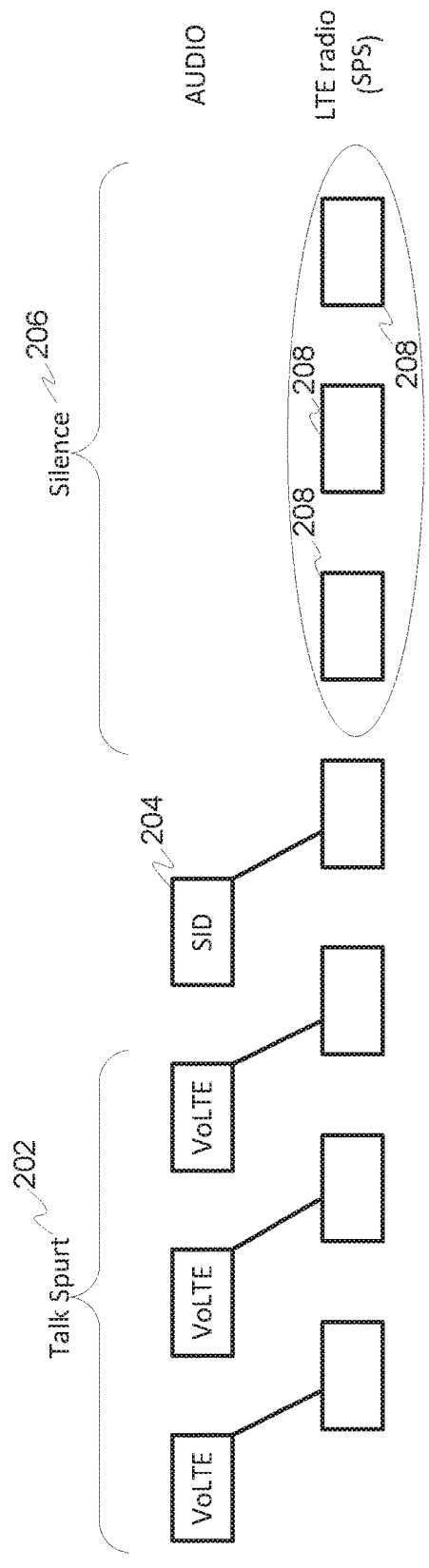
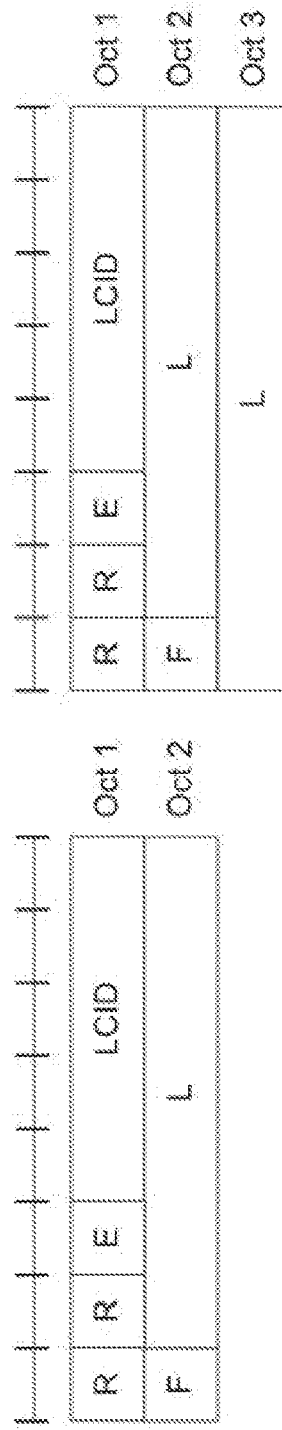
Fig. 2
Fig. 4

METHOD AND APPARATUS FOR VOICE DATA TRANSMISSION

CROSS REFERENCE TO RELATED APPLICATIONS

The present application is a national phase entry under 35 U.S.C. § 371 of International Application No. PCT/US2015/046823, filed Aug. 25, 2015, entitled "METHOD AND APPARATUS FOR VOICE DATA TRANSMISSION", which claims priority to European Patent Application No. 14306506.8, filed Sep. 26, 2014, entitled "METHOD AND APPARATUS FOR VOICE DATA TRANSMISSION," the entire disclosures of which are hereby incorporated by reference herein their entireties.

TECHNICAL FIELD

Embodiments described herein generally relate to the field of wireless communications and, more particularly but not exclusively, to methods and apparatus for performing a Voice over LTE (VoLTE) call with reduced current drain.

BACKGROUND OF THE INVENTION

It is becoming more important to be able to provide telecommunication services to fixed and mobile subscribers as efficient and inexpensively as possible. LTE based networks provide packet based communication for all traffic over the network including voice calls.

Battery life of user equipment operating in wireless networks has become a concern. It would therefore be advantageous to reduce power requirements of providing a VoLTE call without affecting the call quality or user experience.

BRIEF DESCRIPTION OF THE DRAWING

Aspects, features and advantages of embodiments of the present invention will become apparent from the following description of the invention in reference to the appended drawings in which like numerals denote like elements and in which:

FIG. 2 illustrates empty packets transmitted during silent periods during a VoLTE call;

FIG. 4 illustrates MAC sub-headers that can be used to indicate packet type;

DETAILED DESCRIPTION OF EMBODIMENTS

Illustrative embodiments of the present disclosure include, but are not limited to, methods, systems, and apparatuses for controlling signaling relating to a handover between base stations in a wireless communication network.

Various aspects of the illustrative embodiments will be described using terms commonly employed by those skilled in the art to convey the substance of their work to others skilled in the art. However, it will be apparent to those skilled in the art that some alternate embodiments may be practiced using with portions of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order to not obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware instructions and/or programs, a combinational logic circuit, and/or other suitable components that provide the described functionality.

Figure 1:
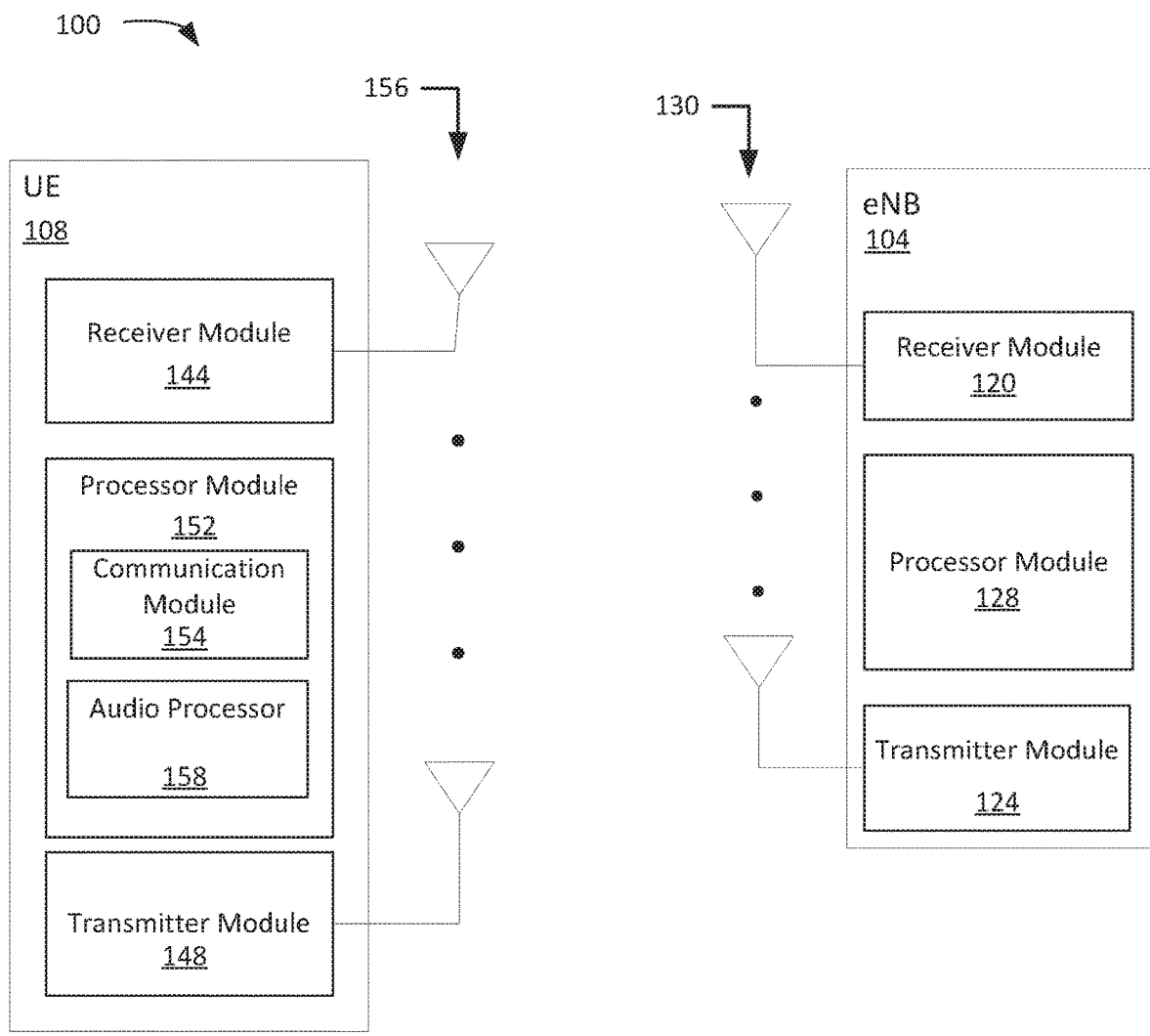
FIG. 1 is block diagram of an example wireless network according to various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) or long-term evolution-advanced (LTE-A) network such as an evolved universal mobile telecommunication system (UMTS) terrestrial radio access network (E-UTRAN).

The network 100 may include a base station, e.g., evolved node base station (eNB) 104, configured to wirelessly communicate with one or more mobile device(s) or terminal(s), e.g., user equipment (UE) 108. In various embodiments, the eNB 104 may be a fixed station (e.g., a fixed node) or a mobile station/node.

The eNB 104 may include a receiver module 120 with which to receive signals from UE 108 via one or more antennas 130. eNB 104 may include a transmitter module 124 with which to transmit signals to UE 108 via one or more antennas 130. eNB 104 may also include a processor module 128 in communication with receiver module 120 and transmitter module 124 and configured to encode and decode information communicated by the signals.

In various embodiments, the UE 108 and/or the eNB 104 may include a plurality of antennas 156, 130 to implement a multiple-input-multiple-output (MIMO) transmission system, which may operate in a variety of MIMO modes, including single-user MIMO (SU-MIMO), multi-user MIMO (MU-MIMO), close loop MIMO, open loop MIMO or variations of smart antenna processing.

In various embodiments, UE 108 comprises a transmitter module 148 for transmitting signals to eNB 104 and a receiver module 144 for receiving signals from the eNB 104. UE 108 further comprises a processor module 152 coupled between a receiver module 144 and a transmitter module 148 and including a communication module 154 to encode and decode information communicated by the signals. Processor module 152 also includes audio processor module 158 to encode voice signals for transmission.

While embodiments of the present invention are described with reference to an LTE network, some embodiments may be used with other types of wireless access networks.

The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, fixed or mobile client devices, relays, base stations, femtocells, gateways, bridges, hubs, routers, access points, or other network devices. Further, the radio systems within the scope of the invention may be implemented in cellular radiotelephone systems, satellite systems, two-way radio systems as well as computing devices including such radio systems including personal computers (PCs), tablets and related peripherals, personal digital assistants (PDAs), personal computing accessories, hand-held communication devices and all systems which may be related in nature and to which the principles of the inventive embodiments could be suitably applied.

In order to carry voice calls over LTE mobile communication networks, the voice signal is encoded within a number of data packets which should be transmitted regularly to give the impression of constant voice communication with low latency. To carry the packetized voice signal, radio resources to transmit the data packets may be allocated in advance to a user equipment 108 by the network. For example, semi-persistent scheduling can be used whereby a user equipment 108 is granted upload resources on a reoccurring basis.

When performing a VoLTE call with semi-persistent scheduling, the UE 108 is expected to transmit on each assigned uplink (UL) grant (typically one grant every 20 ms). During silent periods in the conversation, no new voice data packets will be generated for transmission and therefore no new voice data will be carried within the granted upload resources during the silence period. However, the UE must still transmit in the allocated uplink slot as the transmission is expected by the eNB 104, and therefore 'empty' data packets are transmitted. Failure to transmit a signal in the allocated slot may affect the accuracy of measurements taken at the eNB 104 and could lead the eNB 104 to determine that the radio link between the UE 108 and the eNB 104 has degraded or failed.

Transmission of 'empty' data packets uses power resources at the user equipment and therefore reduces battery life of the device. However, as the eNB 104 cannot know that the absence of uplink power in expected slots is due to the voice inactivity period and not due to a degradation of the RF conditions it has been necessary for UEs to continue to transmit during silent periods to avoid a radio link failure being declared by the network.

According to some embodiments, a UE 108 may be able to reduce or eliminate transmission of 'empty' packets during silent periods in a VoLTE call without affecting measurements of the radio link taken at the eNB 104.

In a UE device, audio activity and radio activity are fully decoupled because they are controlled by two different entities in UL direction:

The Voice Audio Detection (VAD) controls the UL voice activity, sends a SID packet with a 160 ms period when it detects a silence and then Discontinues Transmission (DTX's) UL voice packets until a new talk spurt is started.

The UL LTE transmission is controlled by the LTE base station (eNB) which has no knowledge of the transmitted data and typically gives a semi-persistent UL grant: the UE has to transmit data in predefined LTE subframes.

Typically, LTE padding data are transmitted during audio DTX period (between 2 UL talk spurts), meaning that current drain is unnecessarily used.

FIG. 2 illustrates audio packets being generated by the Audio processor 158 and passed to the communication module 154 for transmission. Audio processing is typically performed by the dedicated audio processor 158 which includes a Voice Activity Detection function. When the Voice Activity Detection detects a silence period, it inserts a SID (silence detected) packet 204 before the voice DTX period. The SID is repeated at every 160 ms. It is encapsulated in a RTP/UDP/IP packet and passed to the communication module. Typically ROHC header compression is done over RTP/UDP/IP header of any VoLTE packet, and then the packet is processed as a regular PDCP packet.

The SID data is then transmitted in a UL SPS subframe. The size of the VoLTE packet is quite small (with ROHC which compresses the RTP/UDP/IP header to less than 3 bytes, the size is less than 60 bytes) so that it is typically transmitted in a single subframe. There is no means to apply a specific processing for a SID packet since the nature of the VoLTE packet is unknown by the communication module. After the SID packet has been transmitted over the air, the audio processor 158 will discontinue transmission of audio VoLTE packets for a significant period 206.

However, the eNB 104 is not aware of this as: the eNB has no means to identify a SID packet 204. The Semi-persistent schedule (SPS) UL pattern is still active and the UE 108 has to transmit a new uplink packet 208 (over the physical Physical Upload Shared Channel—PUSCH-channel) in the SPS subframes although no VoLTE data has to be transmitted. These new PUSCH packets 208 consist of padding. Since RF transmission power is usually a big part of the VoLTE power consumption, these transmissions are a significant waste of power.

It is assumed for the simplicity of this disclosure that SPS UL is enabled and is acting as a dedicated physical channel for the UL VoLTE data, however the skilled person would understand how to extend the described inventive concepts to more general channel configurations, for example LTE Connected DRX where the UL transmission pattern is roughly predefined.

According to some embodiments, a voice audio processor 158 tags the UL SID packets to indicate when a silent period 206 has started/is ongoing. When the last bit of SID packet is being transmitted, the UE 108 does not transmit any new packets on the Physical Upload Shared Channel (PUSCH) while BSR=0 (no RRC signalling message are pending transmission) for the next 160 ms and the communication module 154 in the UE 108 sets a dedicated bit in the MAC header as illustrated in FIG. 4 (or inserts a MAC control element which is dedicated to signal this event to the eNB) so that the eNB is aware that it may not receive any new UL transmission in the next 160 ms.

Embodiments may be applicable if a single radio bearer is active (from a RRC state). Embodiments may further be applicable for use with multiple bearers but with additional signaling complexity.

When the audio processor 158 builds an UL SID 204, it attaches a tag=SID_on to this RTP/UDP/IP packet. This UL SID packet 204 is then sent to the communication module 154 using an IPC (Inter-Processor Communicator). The tag is written in the IPC header for this packet or is provided to the communication to the module by another means. When received, the communication module 154 takes this SID packet and recreates locally the tag for the PDCP layer.

The MAC receives an UL grant for UL packet transmission (either dynamic or as semi-persistent). Typically the UL grant should be large enough for the RLC SDU which carries the SID data (since there is only the VoLTE bearer and since VoLTE bearer does not have RLC retransmissions). The MAC time stamps the time when the SID RLC PDU is transmitted over the air as $t_1$. Then the MAC will ignore any UL grant for new PUSCH transmission or any SPS UL subframe for the VoLTE bearer for a period defined as follows:

period=160 ms−$t_1$ or for the N consecutive UL SPS subframes:

$N$=Int((160 ms−$t_1$)/SPS_period)

It should be noted that the MAC may still have to retransmit the transport block which carries the SID data if it receives a HARQ NACK for this transport block. In parallel, MAC indicates to the eNB 104 that the eNB 104 may not receive any new voice data for the next 160 ms−$t_1$. This notification can be provided either by using one of the reserved R bits of the MAC subheader as shown in FIG. 4 to indicate SID_On or by sending a new dedicated MAC control element SID_CE (the length 160 ms−$t_1$ being signalled in this MAC control element). In case of multiple dedicated bearers, the ID of the voice dedicated bearer could be also indicated in the MAC control element, so that the eNB is informed that the UE may not transmit any new voice data for the silence period on the voice bearer.

The intent of the signalling towards the eNB 104 is to make sure that the eNB UL scheduler does not misinterpret the absence of UL transmission in response to the UL dynamic or semi-persistent grant.

If the RLC SDU is split in 2 RLC PDUs, the MAC behavior is identical, except that the $t_1$ timestamp is computed when the last segment of the RLC SDU of SID is transmitted and SID_On or SID_CE is inserted in the transport block which carries the last part of the RLC SDU for SID.

According to some embodiments, the MAC signalling information is not mandatory, for example the UE could not follow the UL grant for a new PUSCH for the next 160 ms and still use the regular MAC header.

As during this period, the user should be listening, thus the UE 108 will be receiving DL VoLTE data and thus transmitting HARQ ACK/NACK acknowledgment indications over the Physical Upload Control Channel (PUCCH). The eNB 104 could then correctly interpret an absence of new PUSCH data for 160 ms while still receiving acknowledgements over the PUCCH as a silent period at the UE.

Figure 3:
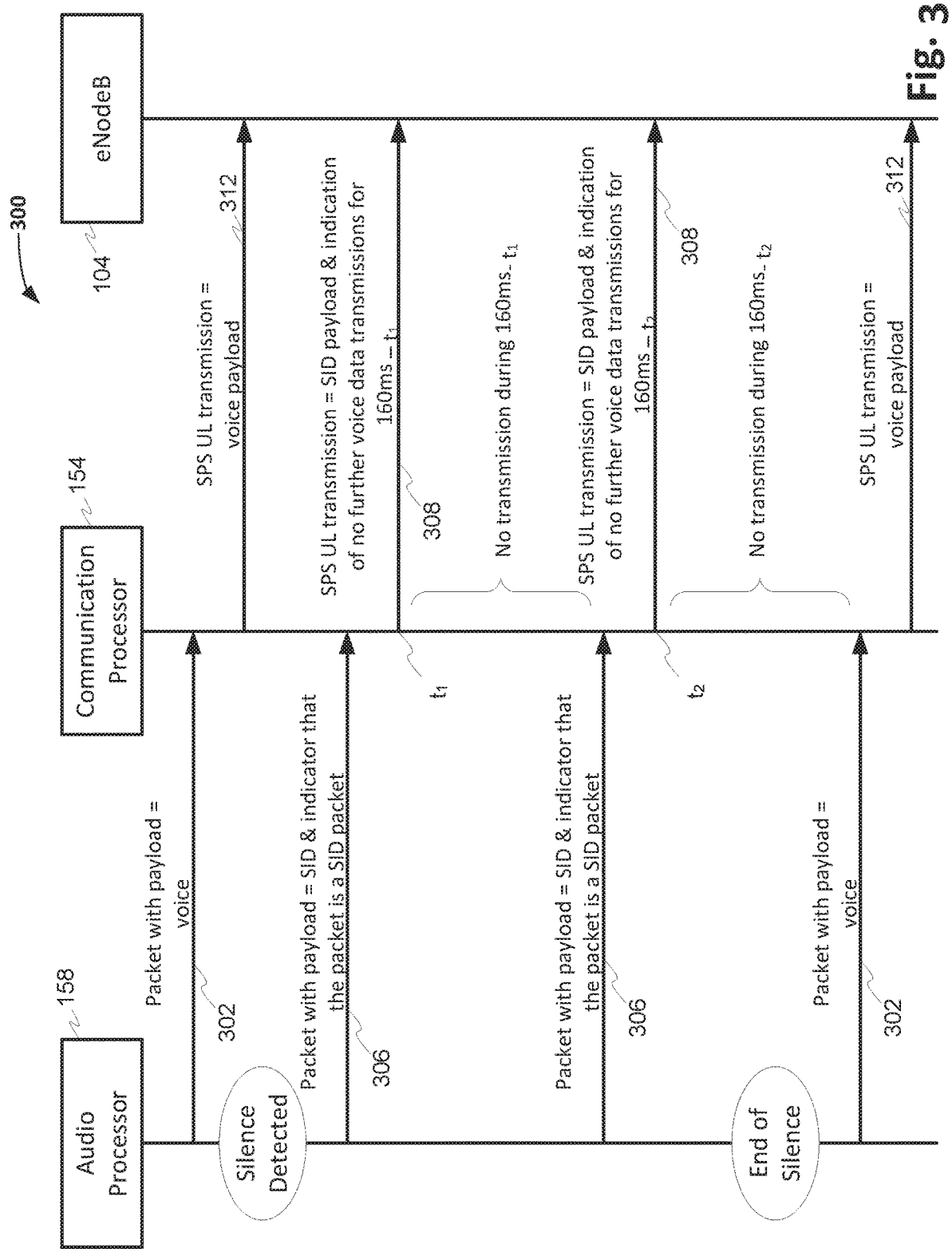
FIG. 3 is a sequence diagram illustrating communication between a user equipment and an eNB according to various embodiments.

FIG. 3 is a sequence diagram illustrating a method 300 according to some embodiments. As illustrated in FIG. 3, during an ongoing VoLTE call, voice data is processed at the audio processor 158 to produce voice data packets 302 that are passed to the communication processor 154. The communication processor then transmits the voice payload data to the eNB 104 using as packets 312 semi-persistently scheduled upload resources.

When the audio processor 158 detects a silence period 304, a packet 306 with a payload comprising a SID along with an indication that the packet is a SID packet is passed to the communication module 154. The communication module 154 determines from the indication that the packet is an SID packet and timestamps the arrival time, $t_0$, of the packet 306 at the communication module 154. The SID payload is then transmitted to the eNB 104 with an indication that the UE will not use the SPS UL resources for a period of time following that transmission. The period of time during which no transmissions are made is 160 ms minus the time between receipt of the packet 306 from the audio processor 158 and transmission of the packet 308 to the eNB 104 by the communication processor 154.

After the determined period has expired, if the silence period continues, the audio processor provides a further SID packet with an indication that the packet is an SID packet to the communication module 154 which is transmitted as to the eNB 104 as described above.

When the audio processor 158 detects the end of the silence period 310, the audio processor resumes provision of normal voice payload packets 302 to the communication module 154 for onward transmission to the eNB 104.

Figure 5:
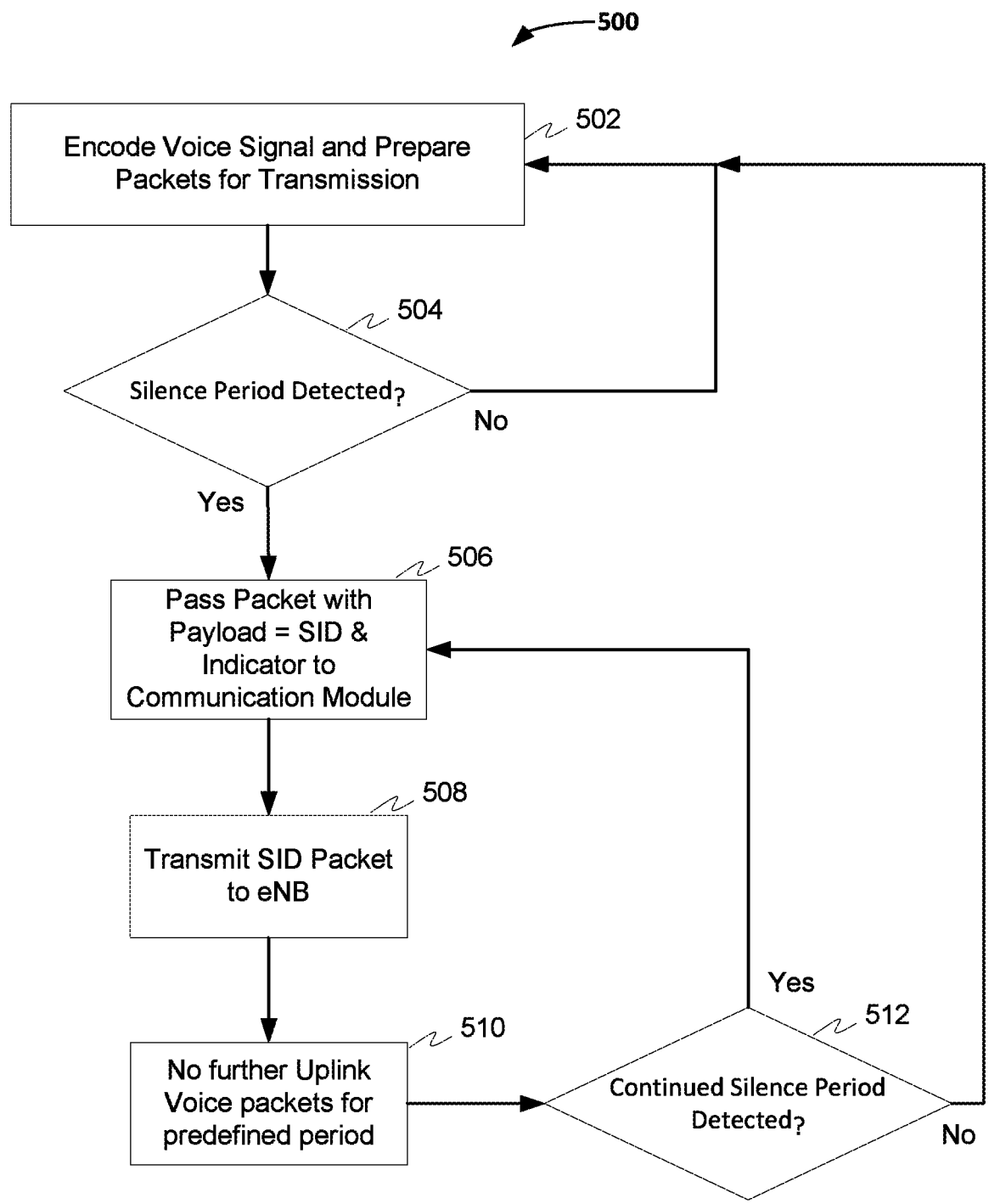
FIG. 5 is a block diagram showing an exemplary method in a user equipment in accordance with various embodiments.

FIG. 5 illustrates a method 500 performed at a UE 108 according to some embodiments. According to the method 500 during a VoLTE call, a voice signal is encoded into packets for transmission 502. A determination is made as to whether a silence period is detected 504 and if not the encoding of the voice signal into packets 502 continues. If a silence period is detected, an SID packet is prepared 506, with an indicator that the packet is an SID packet, and is passed to a communication module 154 for transmission 508 to the eNB 104. The communication module then refrains from transmitting further packets to the eNB 104 for a period of time 510 following the transmission of the SID packet. At the end of the period of time, a determination is made as to whether the silent period is continuing 512. If not, operation returns to encoding of the voice signal into packets 502, however if the silent period is continuing, a further SID packet with indicator is prepared 506 and the method continues as described above.

Figure 6:
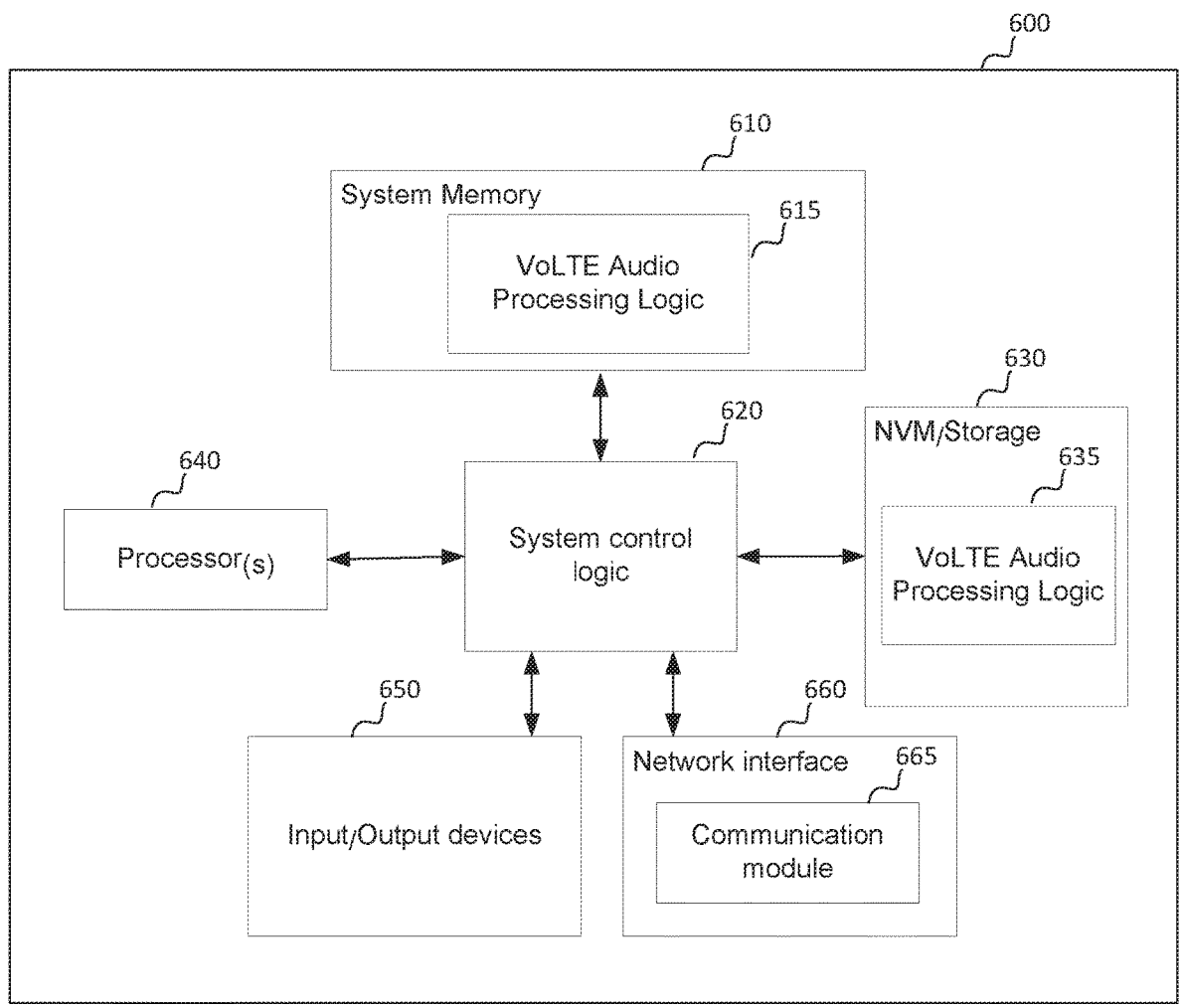
FIG. 6 is a block diagram showing an example system in accordance with various embodiments.

The eNBs 104 and UEs 108 described herein may be implemented into a system using any suitable hardware and/or software to configure as desired. FIG. 6 illustrates, for one embodiment, an example system 600 comprising one or more processor(s) 640, system control logic 620 coupled with at least one of the processor(s) 640, system memory 610 coupled with system control logic 620, non-volatile memory (NVM)/storage 630 coupled with system control logic 620, and a network interface 660 coupled with system control logic 620. The system control logic 620 may also be coupled to Input/Output devices 650.

Processor(s) 640 may include one or more single-core or multi-core processors. Processor(s) 640 may include any combination of general-purpose processors and dedicated processors (e.g., graphics processors, application processors, baseband processors, etc.). Processors 640 may be operable to carry out the above described methods, using suitable instructions or programs (i.e. operate via use of processor, or other logic, instructions). The instructions may be stored in system memory 610, audio processor memory portion 615, or additionally or alternatively may be stored in (NVM)/storage 630, as audio processor portion 635.

Processors(s) 640 may be configured to execute the embodiments of FIGS. 3-5 in accordance with various embodiments. In an embodiment in which the system 600 implements eNB 104, processor(s) 640 may be configured to receive the indication of a silence period from the UE such that the eNB understands that the SPS UL allocation will not be used by the UE for the indicated period of time.

System control logic 620 for one embodiment may include any suitable interface controllers to provide for any suitable interface to at least one of the processor(s) 640 and/or to any suitable device or component in communication with system control logic 620.

System control logic 620 for one embodiment may include one or more memory controller(s) (not shown) to provide an interface to system memory 610. System memory 610 may be used to load and store data and/or instructions, for example, for system 600. System memory 610 for one embodiment may include any suitable volatile memory, such as suitable dynamic random access memory (DRAM), for example.

NVM/storage 630 may include one or more tangible, non-transitory computer-readable media used to store data and/or instructions, for example. NVM/storage 630 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 630 may include a storage resource physically part of a device on which the system 600 is installed or it may be accessible by, but not necessarily a part of, the device. For example, the NVM/storage 630 may be accessed over a network via the network interface 660.

System memory 610 and NVM/storage 630 may respectively include, in particular, temporal and persistent copies of, for example, the audio processor instructions portions 615 and 635, respectively. Instructions portions 615 and 635 may include instructions that when executed by at least one of the processor(s) 640 result in the system 600 implementing method 300 or 500 or the method(s) of any other embodiment, as described herein. In some embodiments, instruction portions 615 and 635, or hardware, firmware, and/or software components thereof, may additionally/alternatively be located in the system control logic 620, the network interface 660, and/or the processor(s) 640.

Network interface 660 may have a transceiver module 665 to provide a radio interface for system 600 to communicate over one or more network(s) (e.g. wireless communication network) and/or with any other suitable device. In various embodiments, the transceiver 665 may be integrated with other components of system 600. For example, the transceiver 665 may include a processor of the processor(s) 640, memory of the system memory 610, and NVM/Storage of NVM/Storage 630. Network interface 660 may include any suitable hardware and/or firmware. Network interface 660 may be operatively coupled to a plurality of antennas to provide a multiple input, multiple output radio interface. Network interface 660 for one embodiment may include, for example, a network adapter, a wireless network adapter, a telephone modem, and/or a wireless modem.

For one embodiment, at least one of the processor(s) 640 may be packaged together with logic for one or more controller(s) of system control logic 620. For one embodiment, at least one of the processor(s) 640 may be packaged together with logic for one or more controllers of system control logic 620 to form a System in Package (SiP). For one embodiment, at least one of the processor(s) 640 may be integrated on the same die with logic for one or more controller(s) of system control logic 620. For one embodiment, at least one of the processor(s) 640 may be integrated on the same die with logic for one or more controller(s) of system control logic 620 to form a System on Chip (SoC).

In various embodiments, the I/O devices 650 may include user interfaces designed to enable user interaction with the system 600, peripheral component interfaces designed to enable peripheral component interaction with the system 500, and/or sensors designed to determine environmental conditions and/or location information related to the system 600.

Figure 7:
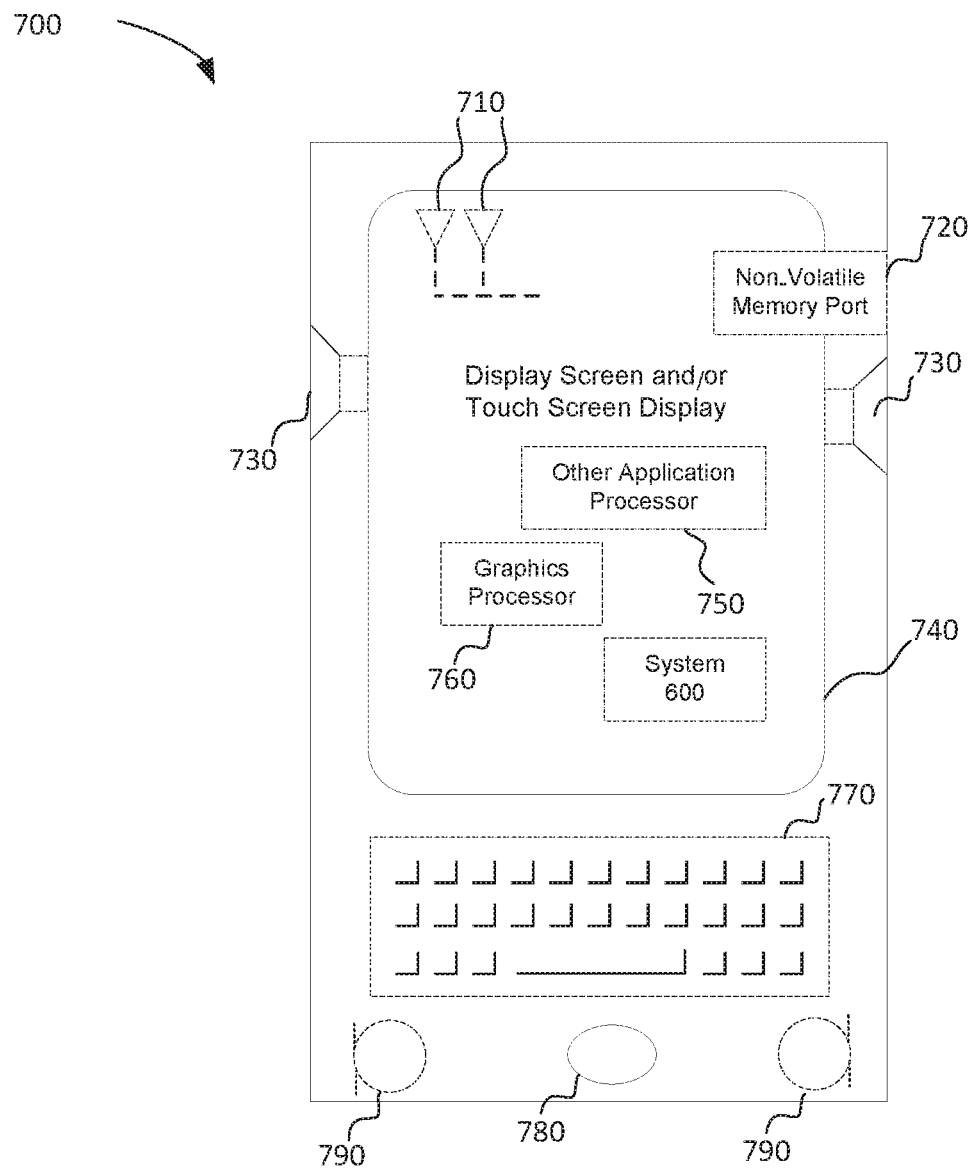
FIG. 7 is a block diagram showing an example wireless apparatus configured for communicating in a wireless network according to one or more of the inventive methods disclosed herein.

FIG. 7 shows an embodiment in which the system 600 implements a UE 108 in the specific form of a mobile device 700.

In various embodiments, user interfaces could include, but are not limited to, a display 740 (e.g., a liquid crystal display, a touch screen display, etc.), a speaker 730, a microphone 790, one or more cameras 780 (e.g., a still camera and/or a video camera), a flashlight (e.g., a light emitting diode flash), and a keyboard 770.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 660 to communicate with components of a positioning network, e.g., a global positioning system (GPS) satellite.

In various embodiments, the system 600 may be a mobile computing device such as, but not limited to, a laptop computing device, a tablet computing device, a netbook, a mobile phone, etc. In various embodiments, system 700 may have more or less components, and/or different architectures.

In embodiments, the implemented wireless network may be a 3rd Generation Partnership Project's long term evolution (LTE) advanced wireless communication standard, which may include, but is not limited to releases 8, 9, 10, 11 and 12, or later, of the 3GPP's LTE-A standards.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

According to various embodiments, there is provided an apparatus for use in a wireless communication system, the apparatus comprising an audio processing module configured to detect a period of silence in a voice signal and to output an indication of the detected period of silence, and a communication module coupled to the audio processing module and configured to transmit upload packets according to a predefined scheduling allocation, the upload packets comprising the voice signal, wherein the communication module is further configured to, upon receipt of an indication of a detected period of silence refrain from transmitting further upload packets using the predefined scheduling allocation for a predetermined period of time.

According to various embodiments, the communication module is further configured to, upon receipt of an indication of a detected period of silence, transmit an indication to an eNB that it will refrain from transmitting further packets in the predefined scheduling allocation during the predetermined period of time.

According to various embodiments, transmitting the indication to the eNB comprises transmitting an upload packet comprising a MAC control element indicating a silence period.

According to various embodiments, transmitting the indication to the eNB comprises transmitting an upload packet comprising specific information in a MAC header indicating a silence period.

According to various embodiments, the MAC control element signals a length of time when the user equipment will refrain transmitting further upload packets using the predefined scheduling allocation.

According to various embodiments, the predefined allocation schedule comprises a semi-persistent allocation schedule.

According to various embodiments, the predefined allocation comprises a Connected-DRX pattern.

According to various embodiments, the wireless communication system is implemented using a packet-oriented technology and where UL transmission is under control of an eNB and where predetermined UL scheduling is used.

According to various embodiments, the wireless technology is one of: the 3rd Generation Partnership Project Long Term Evolution, LTE, Highspeed Uplink Packet Access/Highspeed Downlink Packet Access, HSUPA/HSDPA, or IEEE 802.16, WiMAX.

According to various embodiments, there is provided a method of transmitting VoLTE packets in a wireless communication network, the method comprising obtaining an indication of a detected period of silence from an audio processing module, in response to receiving the indication of a detected period of silence, refraining from transmitting voice data upload packets using a predefined scheduling allocation for a predetermined period of time.

According to various embodiments, the method may further comprise detecting a period of silence in a voice signal and providing the indication of a detected period of silence.

According to various embodiments, the method may further comprise in response to receiving the indication of a detected period of silence, transmitting an indication to an eNB that no voice data upload packets will be transmitted in the predefined scheduling allocation during the predetermined period of time.

According to various embodiments, transmitting the indication to the eNB comprises transmitting an upload packet comprising a MAC control element indicating a silence period.

According to various embodiments, transmitting the indication to the eNB comprises transmitting an upload packet comprising specific information in a MAC header indicating a silence period.

According to various embodiments, the MAC control element signals the length of time when the user equipment may refrain transmitting further upload packets using the predefined scheduling allocation.

According to various embodiments, the predefined allocation schedule comprises one of: a semi-persistent allocation schedule; and a connected-DRX pattern.

According to various embodiments, there is provided an apparatus for use in a wireless communication system, the apparatus comprising audio processing means for detecting a period of silence in a voice signal and outputting an indication of the detected period of silence, and communication means for transmitting upload packets according to a predefined scheduling allocation, the upload packets comprising the voice signal, wherein the communication means are further configured to upon receipt of an indication of a detected period of silence refrain from transmitting further upload packets using the predefined scheduling allocation for a predetermined period of time.

According to various embodiments, there is provided a user equipment comprising a processor, and a non-transient memory comprising computer program instructions that when executed on the processor cause the user equipment to perform a method as described above.

According to various embodiments, there is provided a user equipment comprising an apparatus as described above, and further comprising one or more of a screen, a speaker, a touchscreen, a keyboard, an antenna array including a plurality of antennas, a graphics processor, or an application processor.

According to various embodiments, there is provided a circuit for use in an eNodeB in a wireless communication system, the circuit comprising a communication module configured to receive UL packets transmitted by a user equipment on a predefined scheduling allocation, and a processing module coupled to the communication module configured to detect a silence period notification indicating that the user equipment will not transmit on the predefined scheduling allocation for a predetermined period of time.

According to various embodiments, the silence period notification comprises one of: a MAC control element indicating a silence period; and specific information in a MAC header indicating a silence period.

According to various embodiments, the silence period notification further comprises an indication of the length of time when the user equipment will refrain from transmitting further upload packets using the predefined scheduling allocation.

According to various embodiments, the predefined allocation schedule comprises one of: a semi-persistent allocation schedule; and a Connected-DRX pattern.

According to various embodiments, there is provided a method for use in an eNB in a wireless communication system, the method comprising detecting a silence period notification indicating that a user equipment will not transmit on a predefined scheduling allocation for a predetermined period of time, and refraining from determining a radio link failure for the user equipment for the predetermined period.

According to various embodiments, there is provided a non-transient computer readable medium comprising computer program instructions that when executed on a processor cause a method as described above to be performed.

The invention claimed is:

1. An apparatus for use in a wireless communication system, the apparatus comprising:
   audio processing circuitry to detect a period of silence in a voice signal and to output a silence detected (SID) packet with SID data and a SID tag;
   inter-processor communicator (IPC) circuitry to receive the SID packet from the audio processing circuitry, generate an IPC header with the SID tag, and output the IPC header and the SID data; and
   communication circuitry coupled to the IPC circuitry to receive the IPC header and the SID data, the communication circuitry to re-create the SID tag locally for a packet data convergence protocol (PDCP) layer, wherein a media access control (MAC) layer causes a radio link control (RLC) protocol data unit (PDU) that carries the SID data to be transmitted in an upload packet according to a predefined scheduling allocation, and the MAC layer ignores, based on the SID tag as locally re-created for the PDCP layer, an uplink (UL) grant for a new physical uplink shared channel (PUSCH) transmission or a semi-persistent scheduling (SPS) UL subframe for a bearer for a predetermined period of time or for a predetermined number of consecutive UL SPS subframes.

2. The apparatus of claim 1, wherein the communication circuitry is further to, upon receipt of an indication of a detected period of silence, transmit an indication to an eNB that it will refrain from transmitting further packets in the predefined scheduling allocation during the predetermined period of time.

3. The apparatus of claim 2, wherein to transmit the indication to the eNB the communication circuitry is to transmit an upload packet comprising a MAC control element to indicate a silence period.

4. The apparatus of claim 3, wherein the MAC control element is to signal a length of time that a user equipment will refrain transmitting further upload packets using the predefined scheduling allocation.

5. The apparatus of claim 2, wherein to transmit the indication to the eNB the communication circuitry is to transmit an upload packet comprising specific information in a MAC header to indicate a silence period.

6. The apparatus of claim 1, wherein the predefined allocation schedule comprises a semi-persistent allocation schedule.

7. The apparatus of claim 1, wherein the predefined allocation comprises a Connected-DRX pattern.

8. The apparatus of claim 1 where the wireless communication system is implemented using a packet-oriented wireless technology and where UL transmission is under control of an eNB and where predetermined UL scheduling is used.

9. The apparatus of claim 8, wherein the packet-oriented wireless technology is one of: the 3rd Generation Partnership Project Long Term Evolution, LTE, Highspeed Uplink Packet Access/Highspeed Downlink Packet Access, HSUPA/HSDPA, or IEEE 802.16, WiMAX.

10. One or more non-transitory, computer-readable media having instructions that, when executed, cause:
    audio processing circuitry to detect a period of silence in a voice signal and to output a silence detected (SID) packet with SID data and a SID tag;
    inter-processor communicator (IPC) circuitry to receive the SID packet from the audio processing circuitry, generate an IPC header with the SID tag, and output the IPC header and the SID data; and
    communication circuitry to receive the IPC header and the SID data, re-create the SID tag locally for a packet data convergence protocol (PDCP) layer, wherein a media access control (MAC) layer causes a radio link control (RLC) protocol data unit (PDU) that carries the SID data to be transmitted in an uplink packet according to a predefined scheduling allocation, and the MAC layer ignores, based on the SID tag as locally re-created for the PDCP layer, an uplink (UL) grant for a new physical uplink shared channel (PUSCH) transmission or a semi-persistent scheduling (SPS) UL subframe for a bearer for a predetermined period of time or for a predetermined number of consecutive UL SPS subframes.

11. The one or more non-transitory, computer-readable media of claim 10, wherein the instructions, when executed, further cause the communication circuitry to, upon receipt of an indication of a detected period of silence, transmit an indication to an eNB that it will refrain from transmitting further packets in the predefined scheduling allocation during the predetermined period of time.

12. The one or more non-transitory, computer-readable media of claim 10, wherein to transmit the indication to the eNB the communication circuitry is to transmit an upload packet comprising a MAC control element to indicate a silence period.

13. The apparatus of claim 12, wherein the MAC control element is to signal a length of time that a user equipment will refrain transmitting further upload packets using the predefined scheduling allocation.

14. The one or more non-transitory, computer-readable media of claim 10, wherein to transmit the indication to the eNB the communication circuitry is to transmit an upload packet comprising specific information in a MAC header to indicate a silence period.

15. The one or more non-transitory, computer-readable media of claim 10, wherein the predefined allocation schedule comprises a semi-persistent allocation schedule.

16. The one or more non-transitory, computer-readable media of claim 10, wherein the predefined allocation comprises a connected-discontinuous reception pattern.

17. The one or more non-transitory, computer-readable media of claim 10, wherein the instructions, when executed, further cause a MAC layer to set a timestamp based on transmission of the RLC PDU and determine the predetermined period of time or the predetermined number of consecutive UL SPS subframes based on the timestamp.

18. A method performed by an apparatus in a wireless communication system, the method comprising:
    detecting, using audio processing circuitry, a period of silence in a voice signal;
    outputting a silence detected (SID) packet with SID data and a SID tag;
    receiving, using inter-processor communicator (IPC) circuitry, the SID packet from the audio processing circuitry;
    generating an IPC header with the SID tag and outputting the IPC header and the SID data;
    receiving, using communication circuitry coupled to the IPC circuitry, the IPC header and the SID data; and
    recreating, using the communication circuitry, the SID tag locally for a packet data convergence protocol (PDCP) layer, wherein a media access control (MAC) layer causes a radio link control (RLC) protocol data unit (PDU) that carries the SID data to be transmitted in an upload packet according to a predefined scheduling allocation, and the MAC layer ignores, based on the SID tag as locally re-created for the PDCP layer, an uplink (UL) grant for a new physical uplink shared channel (PUSCH) transmission or a semi-persistent scheduling (SPS) UL subframe for a bearer for a predetermined period of time or for a predetermined number of consecutive UL SPS subframes.

19. The method of claim 18, the method further comprising:
   transmitting, using the communication circuitry upon receipt of an indication of a detected period of silence, an indication to an eNB that it will refrain from transmitting further packets in the predefined scheduling allocation during the predetermined period of time.

20. The method of claim 19, wherein transmitting the indication to the eNB comprises transmitting an upload packet comprising a MAC control element to indicate a silence period.

21. The method of claim 20, wherein the MAC control element is to signal a length of time that a user equipment will refrain transmitting further upload packets using the predefined scheduling allocation.

22. The method of claim 19, wherein transmitting the indication to the eNB comprises transmitting an upload packet comprising specific information in a MAC header to indicate a silence period.

23. The method of claim 18, wherein the predefined allocation schedule comprises a semi-persistent allocation schedule.

24. The method of claim 18, wherein the predefined allocation comprises a Connected-DRX pattern.

25. The method of claim 18, where the wireless communication system is implemented using a packet-oriented wireless technology and where UL transmission is under control of an eNB and where predetermined UL scheduling is used.

26. The method of claim 25, wherein the packet-oriented wireless technology is one of: the 3rd Generation Partnership Project Long Term Evolution, LTE, Highspeed Uplink Packet Access/Highspeed Downlink Packet Access, HSUPA/HSDPA, IEEE 802.16, or WiMAX.

* * * * *

UNITED STATES PATENT AND TRADEMARK OFFICE
CERTIFICATE OF CORRECTION

PATENT NO.         : 10,805,878 B2
APPLICATION NO.    : 15/505542
DATED              : October 13, 2020
INVENTOR(S)        : Guilhaumon et al.

It is certified that error appears in the above-identified patent and that said Letters Patent is hereby corrected as shown below:

In the Claims

Column 12, Line 27, Claim 13, replace "The apparatus of" with -- The one or more non-transitory, computer-readable media of --.

Signed and Sealed this
Seventh Day of September, 2021

Drew Hirshfeld
*Performing the Functions and Duties of the
Under Secretary of Commerce for Intellectual Property and
Director of the United States Patent and Trademark Office*